United States Patent

Nieuwkerk

[11] Patent Number: 5,905,600
[45] Date of Patent: May 18, 1999

[54] METHOD AND APPARATUS FOR RECORDING AND LOCATING INFORMATION ON A STORAGE MEDIUM

[75] Inventor: Aernout J. Nieuwkerk, Eindhoven, Netherlands

[73] Assignee: U.S. Philips Corporation, New York, N.Y.

[21] Appl. No.: 08/778,834

[22] Filed: Jan. 6, 1997

[30] Foreign Application Priority Data

Jan. 12, 1996 [EP] European Pat. Off. ............. 96200061

[51] Int. Cl.$^6$ ........................................................ G11B 5/09
[52] U.S. Cl. ................................................. 360/48; 386/68
[58] Field of Search ................................. 360/13, 32, 48, 360/78.14, 72.2, 75; 386/4, 65, 68, 57; 369/44.11; 395/842

[56] References Cited

U.S. PATENT DOCUMENTS 3,571,528  3/1971  Smith .......................................... 360/13
5,253,131  10/1993  Chevalier .............................. 360/78.14

FOREIGN PATENT DOCUMENTS

9324930  12/1993  WIPO .

Primary Examiner—Aristotelis M. Psitos
Assistant Examiner—Patrick Wamsley
Attorney, Agent, or Firm—Steven S. Rubin

[57] ABSTRACT

An apparatus and method for recording a data signal in at least one data track on a record carrier and for recording an additional signal in an auxiliary track on said record carrier is disclosed. The data track and the auxiliary track are parallel to each other on the record carrier. The first channel signal is recorded in the data track in the form of successive frames. The second channel signal is recorded in the auxiliary track in the form of successive frames, each frame of the second channel signal comprising p signal blocks, where p is an integer larger than 1. The apparatus is adapted to generate frames of the first channel signal which may or may not comprise portions of the data signal. The apparatus generates a frame of the second channel signal, such that, if the frame of the first channel signal is devoid of any portion of the data signal, the corresponding frame of the second channel signal contains a signal in all the signal blocks comprised in that frame; whereas, if the frame of the first channel signal comprises a portion of the data signal, the corresponding frame of the second channel signal has at least one signal block comprising a signal and at least one signal block which is devoid of a signal.

20 Claims, 5 Drawing Sheets

METHOD AND APPARATUS FOR RECORDING AND LOCATING INFORMATION ON A STORAGE MEDIUM

BACKGROUND OF THE INVENTION

1. Field of the Invention

The invention relates to a method and apparatus for recording a data signal in at least one data track and an additional signal in an auxiliary track on a record carrier. The data track and the auxiliary track are parallel to each other on the record carrier. The apparatus comprises: input means for receiving the data signal, conversion means for converting the data signal into a first channel signal, suitable for recording on the record carrier, generator means for generating the additional signal and for converting the additional signal into a second channel signal suitable for recording on the record carrier, and writing means for writing the first channel signal in the data tracks and for writing the second channel signal in the auxiliary track. The first channel signal and the second channel signal are recorded in the form of successive frames. Each frame of the second channel signal comprises p signal blocks, where p is an integer larger than 1. The frames in the data tracks and the frames in the auxiliary track have substantially the same length, and adjacent frames in the data tracks and the auxiliary track lie in the same position when viewed in the longitudinal direction of the tracks. The invention also relates to a record carrier and to a reproducing apparatus compatible with the above recording scheme.

2. Description of the Related Art

An apparatus as defined in the opening paragraph is known from U.S. Pat. No. 5,117,313, document D1 in the list of related documents. A data signal, which is in the form of a digital audio signal is recorded in a number of data tracks lying side by side to each other in the longitudinal direction of the tracks. The auxiliary track is used, amongst others, for location purposes. In the known apparatus, the auxiliary track is used to find the start position of a music selection recorded on the record carrier, particularly when the record carrier is driven with an increased transport speed.

SUMMARY OF THE INVENTION

The invention aims at providing an apparatus having improved capabilities for recording a data signal and an additional signal on a record carrier. To that purpose, the apparatus as defined above is characterized in that the apparatus is adapted to generate frames of the first channel signal, comprising portions of the data signal and frames of the first channel signal which are devoid of any portion of the data signal. The apparatus is further adapted to generate a frame of the second channel signal a, such that, if the frame of the first channel signal generated is devoid of any portion of the data signal, the corresponding frame of the second channel signal comprises portions of the additional signal in all the signal blocks comprised in that frame; whereas, if the frame of the first channel signal generated comprises a portion of the data signal, the corresponding frame of the second channel signal has at least one signal block which is devoid of any portion of the additional signal. The recording apparatus may be further characterized in that the number of signal blocks is an even integer number larger than 2 and that, if the frame of the first channel signal generated comprises a portion of the data signal, the even numbered signal blocks comprise the additional signal, and the odd numbered signal blocks are devoid of the additional signal.

The invention is based on the following recognition. Various situations exist, where no portion of a data signal will be present in a frame in the datatrack. As an example, in an append mode of operation, where new data will be recorded after old data recorded earlier, the first m frames of the first channel signal recorded in the append mode of operation may be unreliable, as they are at the boundary between the old data recorded earlier and the new data. In order to prevent a loss of data, the first m frames are recorded without any portion of the data signal being included in them. When being switched in a reproduction mode, the boundary between the old and the new data may lead to a disturbance of the reproduction electronics during the time required to transport the record carrier over the m frames. As a result, the reproduction electronics will need to be resynchronized before the m frames have passed the read head, so that no data is lost.

In data storage applications, the recording apparatus may run out of data. When the transport speed of the record carrier remains constant, frames without any valid data are thus recorded in the track. The frames in the first channel signal should be skipped upon reproduction, as those frames comprise no valid data.

During a high speed transport mode, it is impossible to identify the frames in the first channel signal, as the data rate of the signal read from the data tracks is too high. Identifying information included in the frames of the first channel signal, and identifying whether the frames comprise valid data, can not be detected during this high speed transport mode.

As the frames in the auxiliary track are subdivided into p signal blocks, where p is preferably 4, it becomes possible to identify the frames comprising valid data or not, by investigating the shape of the envelope signal obtained from the reproduced second channel signal.

In accordance with the invention, the frames comprising no portions of the data signal are identified by the contents of the signal blocks in the frames of the second channel signal. More specifically, frames in the first channel signal comprising no valid data are identified by corresponding frames of the second channel signal which comprise portions of the additional signal in all the signal blocks comprised in each such frame. Further, frames in the first channel signal comprising valid data are identified by corresponding frames of the second channel signal which comprise at least one signal block which contains the additional signal and at least one signal block which is devoid of the additional signal. As a result, when the envelope signal has a constant amplitude, it can be determined that the frames in the first channel signal comprise no valid data; whereas, if the amplitude of the envelope signal changes as a function of time, the frames in the first channel signal comprise valid data.

Moreover, when the reproducing apparatus further comprises counter means for counting the number of amplitude variations of at least one type in the envelope signal and for supplying a count value which has a relationship with said number of amplitude variations detected during said increased transport speed, it is possible to divide the number of amplitude variations to obtain a count value indicating how many frames of the first channel signal comprising valid data have been passed in the high speed transport mode. This enables a repositioning of the record carrier to a required position on the record carrier, such that a required number of frames comprising valid data have been skipped in the high speed transport mode.

The recording apparatus can be further charactertized in that the apparatus further comprises count number generator means for generating a relative frame count number for each of the frames of the first channel signal, the apparatus further being adapted to insert a relative frame count number in each of said frames prior to recording, the relative frame count numbers of two successive frames of the first channel signal increasing by a second unit count value if both frames comprise a portion of the data signal, the relative frame count numbers of two successive frames of the first channel signal remaining the same if both frames are devoid of any portion of the data signal.

In this way, all frames in the first channel signal are identifiable by their absolute count number, whereas all the frames comprising valid data are identifiable by their relative count numbers.

BRIEF DESCRIPTION OF THE DRAWING

These and other aspects of the invention will be apparent from and elucidated with reference to embodiments described hereafter. In the following figure description shows FIG. 1 an embodiment of the recording apparatus, the record carrier and the reproducing apparatus, FIG. 2a and FIG. 2b the serial datastream of the signal recorded in the auxiliary track, FIG. 3a and FIG. 3b the serial datastream in the auxiliary track and the envelope of the said serial datastream, FIG. 4 the signals recorded in the tracks on the record carrier, FIG. 5 the frame count values stored in the frames of one of the tracks, FIG. 6 a further elaboration of the reproducing apparatus, FIG. 7 a further elaboration of the envelope signal generator, and FIG. 8 a further elaboration of the recording apparatus.

DETAILED DESCRIPTION OF THE PREFERRED EMBODIMENTS

Figure 1:
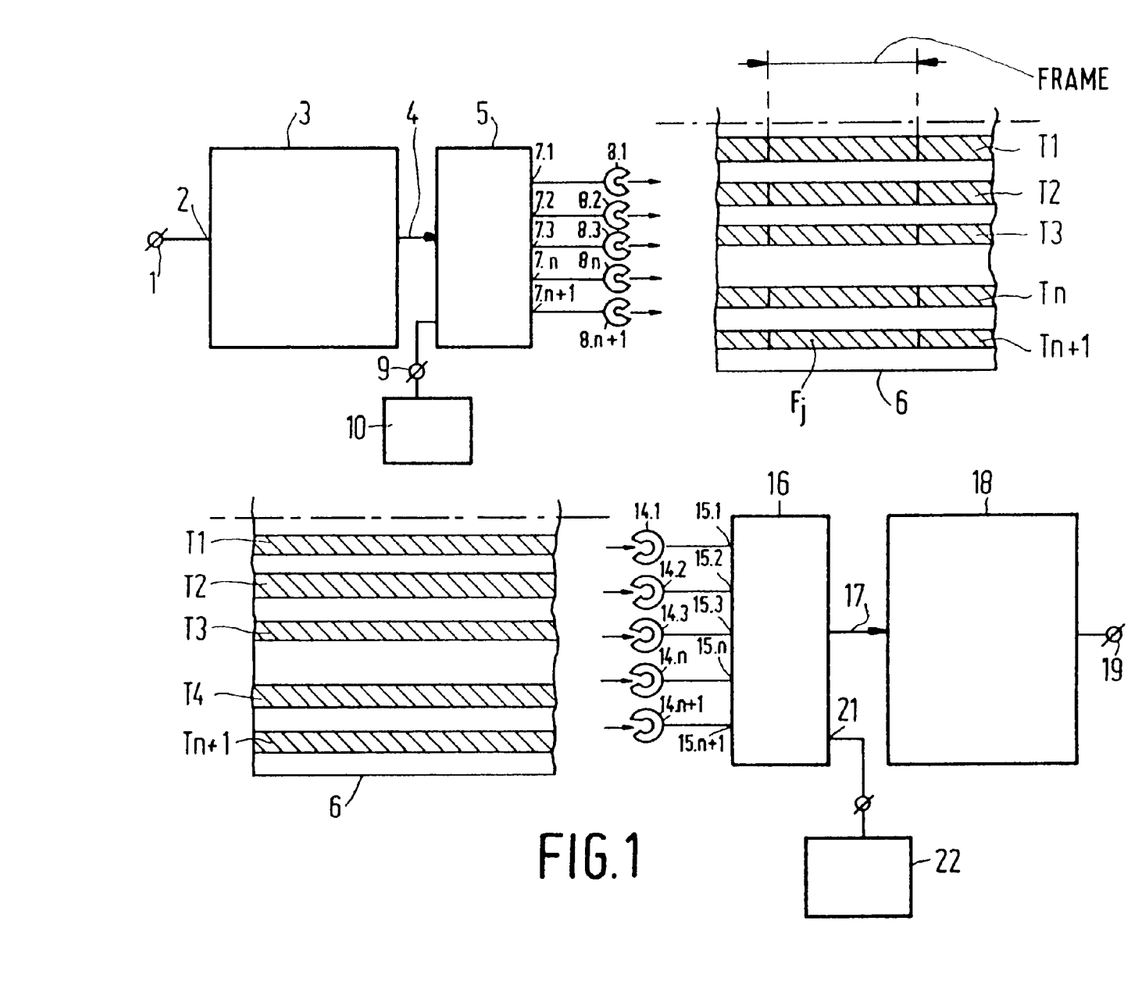

FIG. 1 shows an exemplary embodiment of the recording apparatus for recording the data signal on a record carrier, the record carrier and the reproducing apparatus for reproducing the data signal from the record carrier. The recording apparatus and the record carrier will be discussed first.

The recording apparatus has an input terminal 1 for receiving the data signal, which terminal 1 is coupled to an input 2 of an encoding unit 3. This encoding unit 3 may comprise a channel encoder, well known in the art so as to convert the data signal into a first channel signal. The unit 3 comprises, for example, an 8-to-10 converter. Such an 8–10 converter is described, for example, in U.S. Pat. No. 4,620, 311, document D2 in the list of related documents. In this converter 8-bit data words are converted into 10-bit codewords. Interleaving may occur. All this has for its object to enable an error correction of the received data at the reproduction side. This first channel signal is applied through line 4 to a unit 5.

FIG. 1 shows only part of one half of the record carrier 6. The record carrier is a longitudinal record carrier. On the record carrier 6 a number of tracks $T_1$ to $T_{n+1}$ are depicted running lengthwise over the record carrier. The tracks $T_1$ to $T_n$ are intended to receive the first channel signal for recording. Unit 5 is arranged for distributing the first channel signal and applying this distributed first channel signal to n outputs 7.1 to 7.n. These n outputs are coupled to n recording heads 8.1 to 8.n respectively. With these recording heads the first channel signal is recorded on the n tracks $T_1$ to $T_n$ respectively, on the record carrier. As a result, frames of the first channel signal are recorded in each track, such that the frames have all substantially the same length and adjacent frames in adjacent tracks lie at the same position, viewed in the longitudinal direction of the tracks, as shown in FIG. 1. The frames may be separated by an interframe gap, eg. as described in U.S. Pat. No. 5,267,098, document D3 in the list of related documents.

Figure 2A:
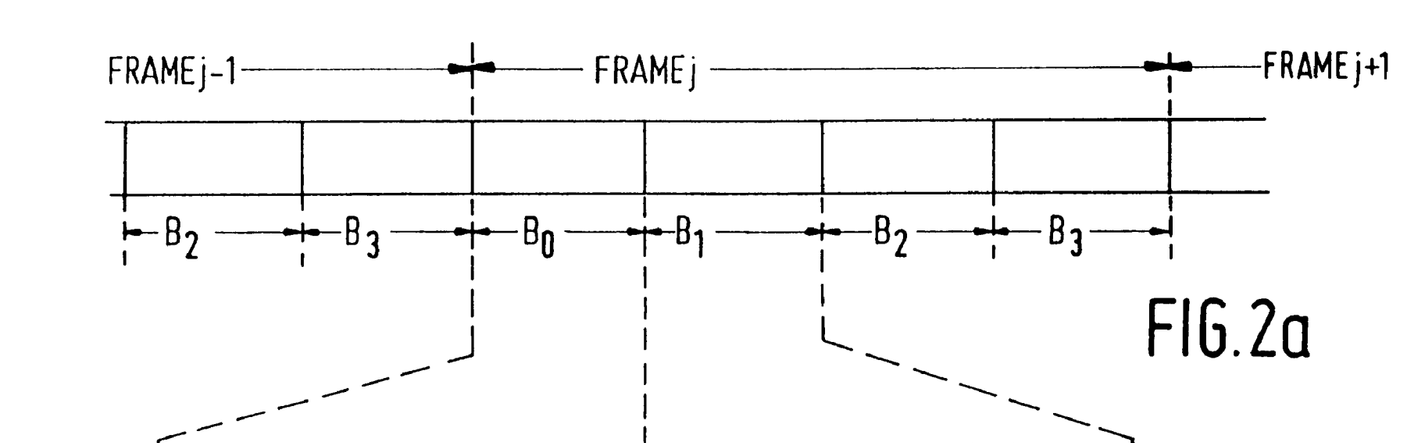

Unit 5 further has an input 9 for receiving the additional signal. The additional signal may comprise sync information, time, date information, text and possibly graphic information. The additional signal may either be applied from the exterior or be generated internally in an additional signal generator 10. Unit 5 may comprise a channel encoder, well known in the art, for rendering the additional signal suitable so that it can be recorded on an additional track $T_{n+1}$ on the record carrier 6. For this purpose unit 5 has an output 7.n+1 coupled to a recording head 8.n+1 for supplying the additional signal in the form of the second channel signal to the head 8.n+1. The data stream of the second channel signal as offered by the unit 5 to the recording head 8.n+1 is shown in FIG. 2. FIG. 2a shows that the data stream is constituted by consecutive frames . . . , j−1, j, j+1, . . . . As shown in FIG. 1, the frames of the second channel signal have the same length as the frames of the first channel signal, and the frames in the track $T_{n+1}$ have the same position, viewed in the longitudinal direction of the record carrier, as the frames in the other tracks. Each frame of the second channel signal comprises a number of p consecutive signal blocks. According to FIG. 2a there are four blocks. Each frame may be terminated by an interframe gap.

Each block is constituted by a first block section (the header) and a second block section (the body). The first block section of a specific first block, that is block $B_0$ comprises a third codeword cw3, a sync signal (or sync word) 101 and a first codeword cw1, in this order. The first block section of the directly successive block, that is block $B_1$, comprises a fourth codeword cw4, a sync word 104 and a second codeword cw2, in this order. The first codeword cw1 is equal to the fourth codeword cw4.

The bit patterns of the codewords have been extensively described in document D1, so that a description of those codewords may be dispensed with. The same argumentation is valid for the sync word.

Figure 2B:
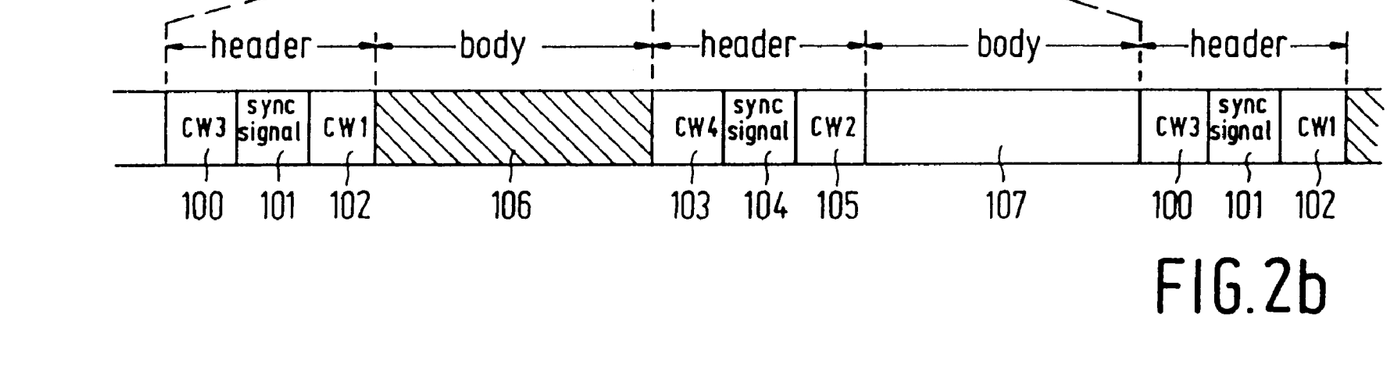

The second block section of the signal block $B_0$ in the frame $F_j$ accommodates a portion of the additional signal. This is shown diagrammatically by the hatching in this second block section. The second block section of the block $B_1$ does not accommodate a portion of the additional signal and thus remains empty. Not accommodating a portion of the additional signal in a second block section of a block may in fact mean that the arrangement erases the record carrier when recording this second block section. The data stream as represented in FIG. 2b is such that always the second block sections of even blocks $B_0$, $B_2$ always accommodate portions of the additional signal, and the second block sections of the odd numbered signal blocks $B_1$, $B_3$ are always empty. More specifically, when the frames in the tracks $T_1$ to $T_n$ are filled with portions of the data signal, then the second block sections of the even numbered signal blocks in the frame $F_j$ (that is: the signal blocks $SB_0$ and $SB_2$) comprise portions of the additional signal, and the second block sections of the odd numbered signal blocks (that is: the signal blocks $SB_1$ and $SB_3$) in the frame $F_j$ are empty. However, when the frames in the tracks $T_1$ to $T_n$ are empty, for reasons described earlier, the second block sections of all the four signal blocks in the frame $F_j$ in the track $T_{n+1}$ comprise portions of the additional signal.

The second channel signal may have a different appearance as will be explained with reference to FIG. 3a and FIG. 3b.

Figure 3A:
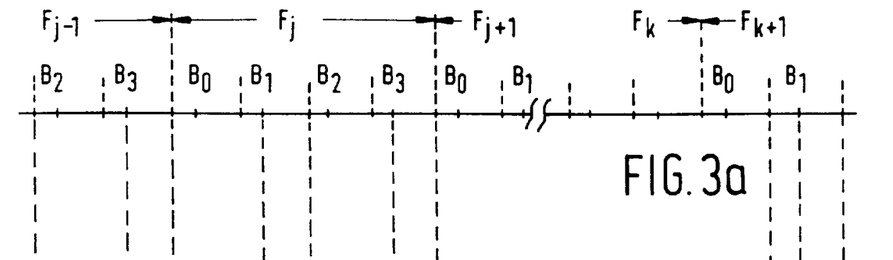
Figure 3B:
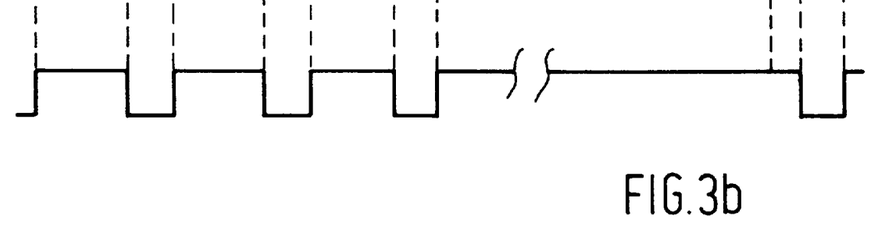

FIG. 3a shows a plurality of consecutive blocks. The frames $F_{j-1}$ (as far as shown) and $F_j$, as well as the frame $F_{k+1}$ (as far as shown) are filled with portions of the additional signal in the way described above with reference to FIGS. 2a and 2b. The frames $F_{j+1}$ to $F_k$ have each signal blocks that are all filled with portions of the additional signal. FIG. 3b shows the envelope of the signal read from the track $T_{n+1}$. For the frames $F_{j-1}$, $F_j$ and $F_{k+1}$ this envelope is a magnitude having alternately a specific amplitude and then a smaller amplitude, for example, zero. From the frames $F_{j+1}$ to $F_k$ the envelope remains "high".

The "filling" of two block sections of the odd signal blocks in the frames $F_{j+1}$ to $F_k$ may be effected in different ways. For example, the information accommodated in the second block section of block $B_0$ in the frame $F_{j+1}$ could be repeated and stored in the second block sections of the blocks $B_1$ and $B_3$. Or, other portions of the additional signal could have been stored in the second block sections of the blocks $B_1$ and $B_3$. However, it may also only be a matter of the second block sections of the odd blocks being filled, irrespective of the information these block sections would contain. In that case, these block sections could also be filled with random information, for example, alternating "zeros" and "ones".

The fact that the envelope signal remains 'high' for the frames $F_{j+1}$ to $F_k$ in the track $T_{n+1}$ means that the corresponding frames in the tracks $T_1$ to $T_n$, lying at the same position as the frames $F_{j+1}$ to $F_k$, viewed in the longitudinal direction of the record carrier, are all empty. Or, more specifically, those frames in the tracks $T_1$ to $T_n$ do not comprise a portion of the data signal. For frames in the track $T_{n+1}$ having an alternating envelope, this means that the corresponding frames in the tracks $T_1$ to $T_n$, lying at the same position as the said frames having the alternating envelope, viewed in the longitudinal direction of the record carrier, have a portion of the data signal stored in them. More specifically, when the frame $F_j$ in the track $T_{n+1}$ shown in FIG. 1 has a contents as shown in FIG. 2b, this means that the corresponding frames at the same location as the frame $F_j$ in the tracks $T_1$ to $T_n$ are not all devoid of a portion of the data signal.

Figure 4:
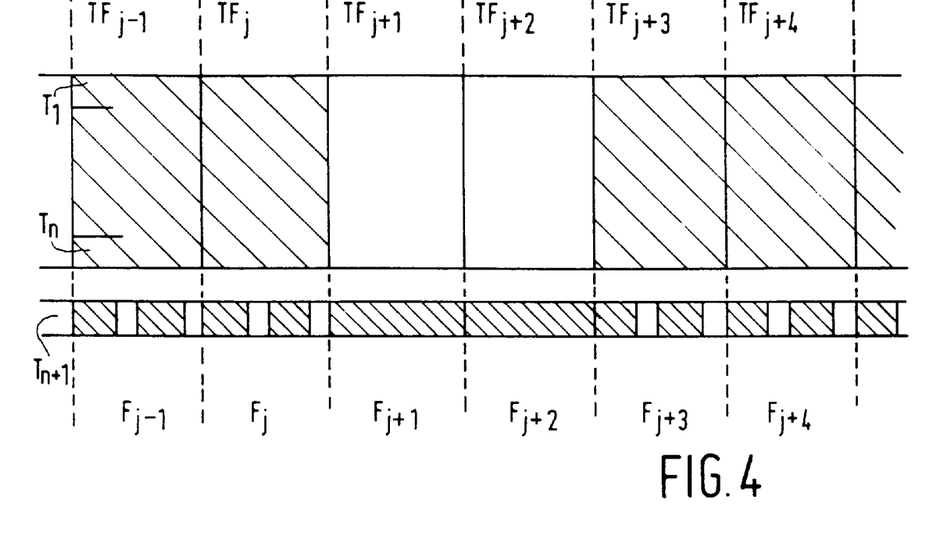

Various situations can occur where the frames in the tracks $T_1$ to $T_n$ do not comprise any portion of the data signal. As a first example, in an append mode of operation, when a new data signal has to be recorded after data that has been recorded earlier on the record carrier. This is schematically shown in FIG. 4. This figure shows tape frames $TF_{j-1}$, $TF_j$, $TF_{j+1}$, $TF_{j+2}$, . . . , each tape frame comprising the track frames $F_{j-1}$, $F_j$, $F_{j+1}$, $F_{j+2}$, . . . respectively in the tracks $T_1$ to $T_n$, which lie at the same location viewed in the longitudinal direction of the record carrier. FIG. 4 shows the record carrier where the old data signal has been recorded in the tape frames prior to the tape frame $TF_{j+1}$. This is indicated by the hatching in the tape frames $TF_{j-1}$ and $TF_j$, and the specific 'filling' of the frames $F_{j-1}$ and $F_j$ in the track $T_{n+1}$, as explained with reference to FIG. 2b. New tape frames will be recorded on the record carrier for recording the new data signal in the append mode of operation after the tape frame $F_j$. First two 'empty' tape frames $TF_{j+1}$ and $TF_{j+2}$ are recorded in the tracks $T_1$ to $T_n$. That means: the frames $F_{j+1}$ and $F_{j+2}$ in the tracks $T_1$ to $T_n$ do not comprise a portion of the data signal. To identify the 'empty' track frames in the tracks $T_1$ to $T_n$, the frames $F_{j+1}$ and $F_{j+2}$ in the track $T_{n+1}$ are completely filled with a portion of the additional signal, as explained in FIGS. 3a and 3b. Next, portions of the data signal are stored in the track frames of the tape frames $TF_{j+3}$, $TF_{j+4}$, . . . etc. This is indicated by the hatching in those tape frames.

In another situation, consider the result when the unit 3 of FIG. 1 runs out of data. One alternative is to halt the record carrier until more data is received. It may, however, be appropriate to maintain the transport speed of the record carrier. In such a situation, the apparatus generates 'empty' tape frames, as defined above, and records those empty frames in the tracks $T_1$ to $T_n$ and corresponding 'filled' track frames in the track $T_{n+1}$.

In again another situation, one could identify the portions and lead-out of a longitudinal record carrier indicate a space by recording 'empty' tape frames in the tracks $T_1$ to $T_n$ and corresponding 'filled' track frames in the track $T_{n+1}$.

Figure 5:
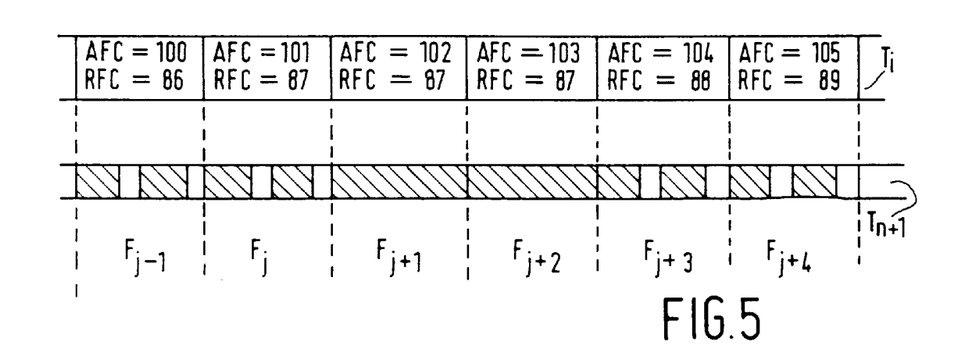

The recording apparatus of FIG. 1 may further be adapted to generate absolute frame count numbers and relative frame count numbers. The generation of the absolute frame count numbers AFC and the relative frame count numbers RFC will be explained hereafter with reference to FIG. 5. FIG. 5 shows the frames in the auxiliary track $T_{n+}$and the frames in one of the tracks $T_1$ to $T_n$, which is the track $T_i$. FIG. 5 shows the situation of FIG. 4, where the frames $F_{j+1}$ and $F_{j+2}$ are 'empty'. As can be seen in FIG. 5 the absolute frame count number is unique for each frame in the track $T_i$, and increases by a unit count value, which is unity in the present example, for subsequent frames in the track. The relative frame count value, however increases by a unit count value only for those frames in the track $T_{n+1}$ that lie adjacent to frames in the track $T_i$ that comprise portions of the data signal. The relative count value does not increase for those frames in the track $T_{n+1}$ that lie adjacent frames in the track $T_i$ that are 'empty', such as the frames $F_{j+1}$ and $F_{j+2}$. As a result, the frames $F_{j+1}$ and $F_{j+2}$ have the same RFC value (in this example, 87), as the frame $F_j$. As an alternative, both frames $F_{j+1}$ and $F_{j+2}$ could have had an RFC value of 88.

The use of the information stored on the auxiliary track $T_{n+1}$ will be further explained in the sequel with reference to the discussion of the reproducing apparatus.

FIG. 1 also shows a reproducing apparatus for reading information from the record carrier 6. The apparatus comprises a plurality of reading heads 14.1, 14.2, 14.3, . . . , 14.n, 14.n+1, each coupled to an input 15.1, 15.2, 15.3, . . . , 15.n and 15.n+1 respectively, of a reading unit 16. The unit 16 is arranged for bringing the first channel signal read from the tracks $T_1$ to $T_n$ into a serial datastream and for applying the first channel signal over line 17 to the reconversion unit 18. For reconverting the first channel signal read from the record carrier, the unit 18 has to be able to deinterleave and reconvert the 10-bit channel words to the 8-bit information words and to carry out an error correction.

The unit 16 is further arranged for reading the second channel signal from the track $T_{n+1}$ by means of the reading head 14.n+1. The unit 16 is capable of carrying out a channel decoding step on the second channel signal so that the additional signal can be regenerated and supplied to the output 21. This output 21 may be coupled to a display 22 on which part of the additional information, such as the character information in the additional information, may be visualised.

The normal functioning of the reproducing apparatus has been explained extensively in the earlier mentioned document D1. Therefore, the description of the functioning of the reproducing apparatus will mainly focus on the use of the signal stored in the auxiliary track $T_{n+1}$, when the reproducing apparatus is in a fast forward or fast rewind transport mode.

As has been explained earlier, the reproduction electronics may be incapable of detecting the signals recorded in the tracks $T_1$ to $T_n$, when the transport speed of the record carrier is in the high speed transport mode, such as during fast forward and fast rewind. The reproducing apparatus is however capable of deriving an envelope signal from the signal read from the auxiliary track in the said high speed transport mode.

Figure 6:
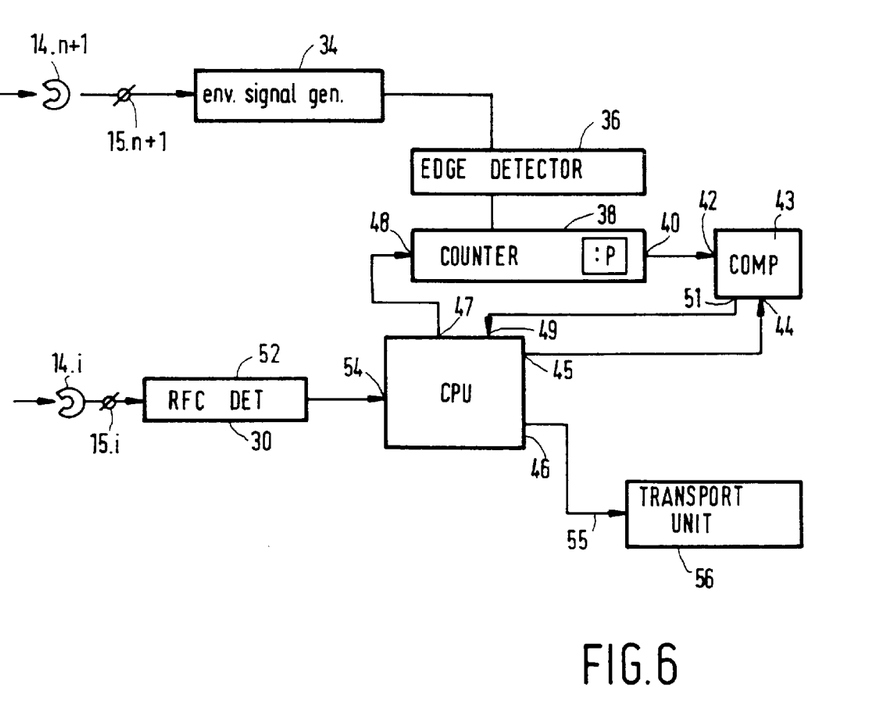

FIG. 6 shows schematically a diagram of a further elaboration of the reproducing apparatus of FIG. 1. The input 15.n+1 is coupled to an input of an envelope signal generator unit 34, which has an output coupled to an input of an edge detector 36. The edge detector 36 has an output coupled to a counter unit 38, which has a count value output 40 coupled to a first count value input 42 of a comparator unit 43. The comparator unit 43 has a second count value input 44 coupled to a count value output 45 of a central processing unit 46. The CPU has an output 47 which is coupled to a reset input 48 of the counter unit 38, and a control signal input 49, which is coupled to a control signal output 51 of the comparator 43.

Further, the input 15.i, which is coupled to the read head 14.i for reading the information in the track $T_i$, is coupled to an input of an RFC detector 52, which has an output coupled to an input 54 of the central processing unit 44. Also a record carrier transport unit 56 is available for transporting the record carrier at the nominal reproduction speed and at a high speed in either the forward or the backward direction.

When reading out the record carrier at a nominal reproduction speed, the apparatus is capable of retrieving the relative frame count values by means of the RFC detector 30. When the record carrier needs to be transported to another location at a high speed, this other location may be known to the apparatus by its RFC count value. The processing unit 46 switches the transport speed into the high speed mode. The unit 46 further supplies a count value via its output 45 to the second count value input 44 of the comparator unit 43 and supplies a reset signal via its output 47 to the counter 38. The counter 38 is reset in response to said reset signal. The count value supplied to the input 44 of the comparator may be a value indicating the number of frames that should be skipped in the high speed mode in order to reach the 'other' position, defined above. The signal read from the track $T_{n+1}$ is supplied to the envelope signal generator 34, which supplies an envelope signal in response to the signal supplied to its input. The envelope signal may have the shape as given in FIG. 3b. The edge detector 36 detects the rising edges in the envelope signal, and supplies one pulse for each edge detected to the counter 38. As a consequence, for each frame skipped, two pulses are generated by the detector 36 and counted by the counter 38. The counter 38 supplies a count value divided by two to its output 40. When the count value divided by two, supplied by the counter 38 equals the count value supplied by the processing unit 46, the comparator 43 generates a control signal at its output 51, which control signal is supplied to the input 49 of the processing unit 46. In response to the receipt of the control signal, the processing unit 46 controls the transport unit 56 in such a way that the record carrier is halted, or repositioned such that the head 14.i is positioned at the required position, viewed in the longitudinal direction of the track.

The record carrier may have already shot through too far. In that case the central processing unit 46 will apply to the transport unit 56 through line 55 a control signal on the basis of which the record carrier is rewound at normal reproduction speed but in reverse direction. The track $T_i$ can now be read out in a normal fashion by the head 15.i. The RFC values can now be detected and the head 15.i can be positioned accurately on the required location.

Figure 7:
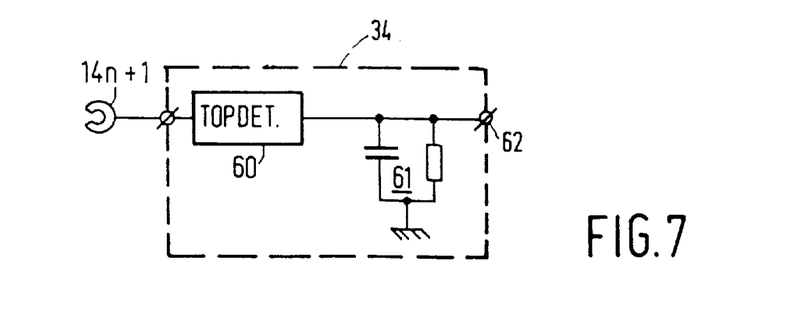

FIG. 7 shows an exemplary embodiment of the envelope signal generator 34 of FIG. 6. The generator 34 comprises a top detector 60 and a low-pass filter 61 constituted by a parallel connection of a capacitor and a resistor.

The signal read out by the head 14.n+1 is applied to the input of the detector 34. The top detector 60 and the low-pass filter 61 produce the envelope signal of FIG. 3b.

Figure 8:
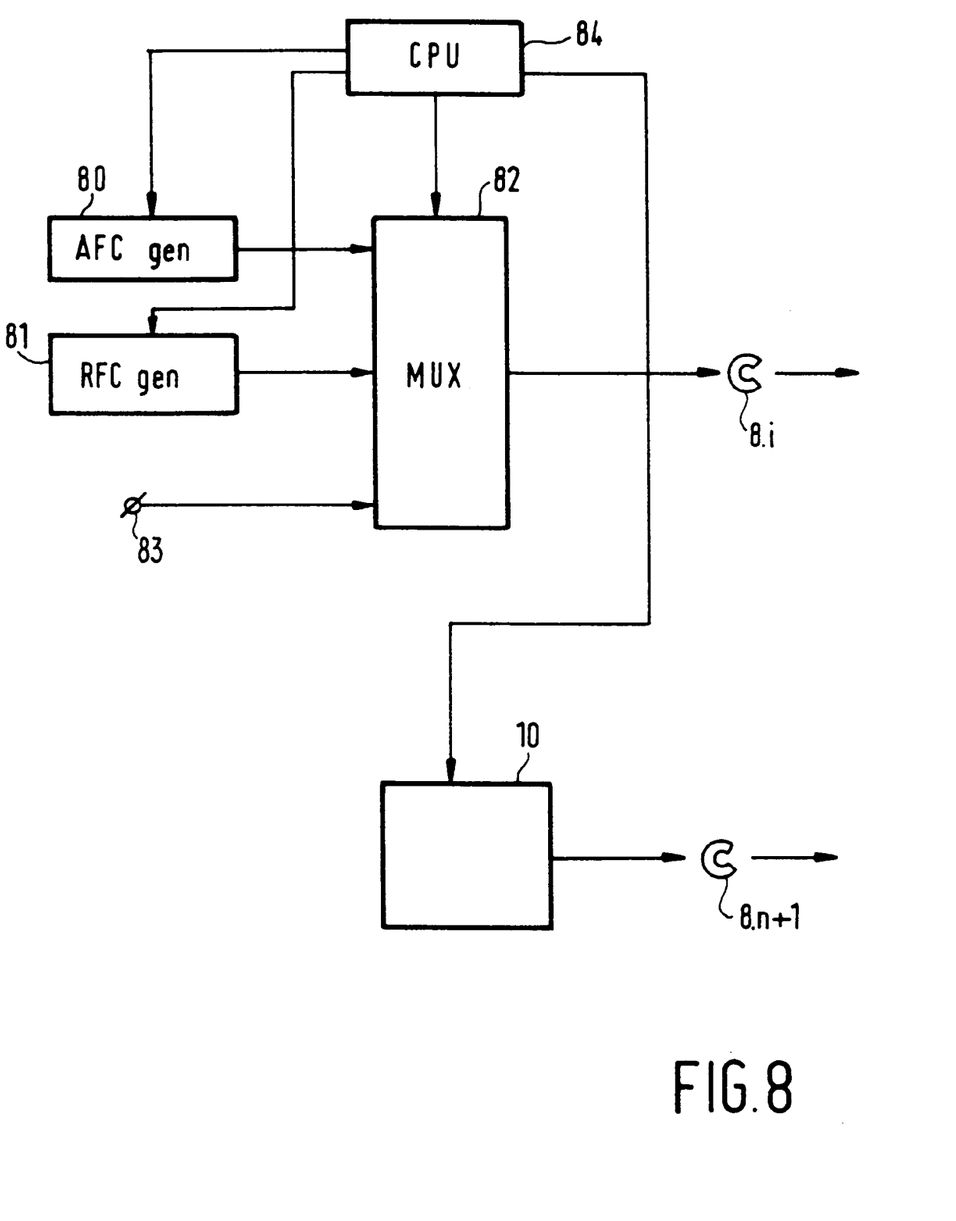

FIG. 8 shows a schematically some additional elements in the recording apparatus. The apparatus comprises a central processing unit 84, an absolute frame count value generator 80, a relative frame count value generator 81 and a multiplexer 82. Further, the additional signal generator 10 is present. Via an input 83, the information for storage in a track frame of one of the tracks $T_1$ to $T_n$ is supplied to the multiplexer 82. The processing unit 84 controls the generators 80 and 81 to supply an AFC value and an RFC value, which are also supplied to the multiplexer 82. The multiplexer combines the data supplied to the input 83, the AFC value and the RFC value into one track frame, which information is supplied to the head 8.i. Parallel to that, the processing unit 84 controls the generator 10 to supply the additional signal for storage in the frames of the auxiliary track.

Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the number of tracks in which the data signal is to be recorded can be chosen as required for the specific application. If a prior art DCC apparatus as described in the documents D1 and D3 is used, the number of tracks can be 8. Further, the invention lies in each and every novel feature or combination of features as herein disclosed.

RELATED DOCUMENTS (D1) U.S. Pat. No. 5,117,313 (PHN 13.209)

(D2) U.S. Pat. No. 4,620,311 (PHN 11.117)

(D3) U.S. Pat. No. 5,267,098 (PHN 13.281)

I claim:

1. Apparatus for recording a data signal in at least one data track on a record carrier and for recording an additional signal in an auxiliary track on said record carrier, the data track and the auxiliary track lying parallel to each other on the record carrier, the apparatus comprising:

input means for receiving the data signal;

conversion means for converting the data signal into a first channel signal, suitable for recording on the record carrier;

generator means for generating the additional signal and for converting the additional signal into a second channel signal suitable for recording on the record carrier;

writing means for writing the first channel signal in said at least one data track and for writing the second channel signal in said auxiliary track;

the first channel signal recorded in said at least one data track being in the form of successive frames;

the second channel signal recorded in said auxiliary track being in the form of successive frames, each frame of the second channel signal comprising p signal blocks, where p is an integer larger than 1;

the frames in the at least one data track and the frames in the auxiliary track having substantially the same length, and adjacent frames in the datatrack and the auxiliary track lying in the same position when viewed in the longitudinal direction of the tracks;

the apparatus being adapted to generate frames of the first channel signal comprising portions of the data signal, and frames of the first channel signal being devoid of any portion of the data signal;

the apparatus further being adapted to generate a frame of the second channel signal such that, when the frame of the first channel signal generated is devoid of any portion of the data signal, the corresponding frame of the second channel signal comprises portions of the additional signal in all the signal blocks comprised in that frame, and that, when the frame of the first channel signal generated comprises a portion of the data signal, the corresponding frame of the second channel signal has at least one signal block comprising a portion of the additional signal and at least one signal block being devoid of any portion of the additional signal.

2. Apparatus as claimed in claim 1, characterized in that, p is an even integer number larger than 2 and that, when the frame of the first channel signal generated comprises a portion of the data signal, the corresponding frame of the second channel signal has even numbered signal blocks comprising a portion of the additional signal and odd numbered signal blocks being devoid of any portion of the additional signal.

3. Apparatus as claimed in claim 2, characterized in that, the apparatus further comprises count number generator means for generating a relative frame count number for each of the frames of the first channel signal, the apparatus further being adapted to insert a relative frame count number in each of said frames prior to recording, the relative frame count numbers of two successive frames of the first channel signal increasing by a second unit count value when both frames comprise a portion of the data signal, the relative frame count numbers of two successive frames of the first channel signal remaining the same when both frames are devoid of any portion of the data signal.

4. Apparatus as claimed in claim 3, characterized in that the count number generator means are further adapted to generate an absolute count number for each of the frames of the first channel signal, the apparatus further being adapted to insert an absolute frame count number in each of said frames prior to recording, the absolute frame count numbers increasing by a first unit count value for each subsequent frame of the first channel signal to be recorded.

5. Apparatus as claimed in claim 2, characterized in that in an append mode of operation, the apparatus is adapted to find the last frame of the first channel signal written in the at least one data track in an earlier recording step, and is adapted to generate first m frames of the first channel signal and to record said m frames directly after the last frame earlier recorded, the said m frames being devoid of any portion of the data signal.

6. Apparatus as claimed in claim 1, characterized in that, the apparatus further comprises count number generator means for generating a relative frame count number for each of the frames of the first channel signal, the apparatus further being adapted to insert a relative frame count number in each of said frames prior to recording, the relative frame count numbers of two successive frames of the first channel signal increasing by a second unit count value when both frames comprise a portion of the data signal, the relative frame count numbers of two successive frames of the first channel signal remaining the same when both frames are devoid of any portion of the data signal.

7. Apparatus as claimed in claim 6, characterized in that the count number generator means are further adapted to generate an absolute count number for each of the frames of the first channel signal, the apparatus further being adapted to insert an absolute frame count number in each of said frames prior to recording, the absolute frame count numbers increasing by a first unit count value for each subsequent frame of the first channel signal to be recorded.

8. Apparatus as claimed in claim 7, characterized in that in an append mode of operation, the apparatus is adapted to find the last frame of the first channel signal written in the at least one data track in an earlier recording step, and is adapted to generate first m frames of the first channel signal and to record said m frames directly after the last frame earlier recorded, the said m frames being devoid of any portion of the data signal.

9. Apparatus as claimed in claim 6, characterized in that in an append mode of operation, the apparatus is adapted to find the last frame of the first channel signal written in the at least one data track in an earlier recording step, and is adapted to generate first m frames of the first channel signal and to record said m frames directly after the last frame earlier recorded, the said m frames being devoid of any portion of the data signal.

10. Apparatus as claimed in claim 1, characterized in that in an append mode of operation, the apparatus is adapted to find the last frame of the first channel signal written in the at least one data track in an earlier recording step, and is adapted to generate first m frames of the first channel signal and to record said m frames directly after the last frame earlier recorded, the said m frames being devoid of any portion of the data signal.

11. Apparatus for reproducing a data signal recorded in at least one data track on a record carrier and for reproducing an additional signal recorded in an auxiliary track on said record carrier, the data track and the auxiliary track lying parallel to each other on the record carrier, the data signal being recorded as a first channel signal in said at least one data track in the form of successive frames, the additional signal being recorded as a second channel signal in said auxiliary track in the form of successive frames, each frame of the second channel signal comprising p signal blocks, where p is an integer larger than 1, the frames in the at least one data track and the frames in the auxiliary track having substantially the same length and adjacent frames in the datatrack and the auxiliary track lying in the same position when viewed in the longitudinal direction of the tracks, the apparatus comprising:

reading means for reading the first channel signal from said at least one data track and for reading the second channel signal from said auxiliary track;

reconversion means for reconverting the first channel signal into said data signal;

output means for supplying the data signal;

envelope detector means for receiving the second channel signal and for generating in the case of an increased transport speed of the record carrier an envelope signal in response to said second channel signal;

the apparatus further includes counter means for counting the number of amplitude variations of at least one type in the envelope signal and for supplying a count value which has a relationship with said number of amplitude variations detected during said increased transport speed.

12. Apparatus as claimed in claim 11, characterized in that the counter means comprise divider means for dividing the number of amplitude variations of said at least one type so as to obtain said count value.

13. An apparatus for recording a data signal in at least one data track on a recording medium and for recording an additional signal in an auxiliary track on said recording medium comprising:

means for converting the data signal into a first channel signal, suitable for recording on the recording medium;

means for converting the additional signal into a second channel signal suitable for recording on the recording medium;

writing means for writing the first channel signal in said at least one data track and for writing the second channel signal in said auxiliary track;

the first channel signal recorded in said at least one data track being in the form of successive frames;

the second channel signal recorded in said auxiliary track being in the form of successive frames, each frame of the second channel signal comprising p signal blocks, where p is an integer larger than 1;

said apparatus being adapted to generate frames of the first channel signal comprising portions of the data signal, and frames of the first channel signal being devoid of any portion of the data signal; and said apparatus further being adapted to generate a frame of the second channel signal such that based upon an absence or a presence of a portion of the additional signal in a frame of the second channel signal, a determination is made as to whether there is any portion of the data signal in a corresponding frame of the first channel signal.

14. A method for recording a data signal in at least one data track on a recording medium and for recording an additional signal in an auxiliary track on said recording medium, said method comprising:

converting the data signal into a first channel signal, suitable for recording on the recording medium;

converting the additional signal into a second channel signal suitable for recording on the recording medium;

writing the first channel signal in said at least one data track in the form of successive frames, some of said frames having portions of said data signal, some of said frames being devoid of any portion of said data signal;

writing the second channel signal in said auxiliary track in the form of successive frames, each frame of the second channel signal comprising p signal blocks, where p is an integer larger than 1, said frames of the second channel signal being written such that based upon an absence or a presence of a portion of the additional signal in a frame of the second channel signal, a determination is made as to whether there is any portion of the data signal in a corresponding frame of the first channel signal.

15. The method as claimed in claim 14 further comprising the steps of:

generating a relative frame count number for each of the frames of the first channel signal; and inserting the relative frame count number in each of said frames prior to recording, the relative frame count numbers of two successive frames of the first channel signal increasing by a second unit count value if both frames comprise a portion of the data signal, the relative frame count numbers of two successive frames of the first channel signal remaining the same if both frames are devoid of any portion of the data signal.

16. The method as claimed in claim 15 further comprising the steps of:

generating an absolute frame count number for each of the frames of the first channel signal;

inserting the absolute frame count number in each of said frames prior to recording, the absolute frame count numbers increasing by a first unit count value for each subsequent frame of the first channel signal to be recorded.

17. The method as claimed in claim 14 wherein:

p is an even integer number larger than 2 and that, when the frame of the first channel signal generated comprises a portion of the data signal, the corresponding frame of the second channel signal has even numbered signal blocks comprising a portion of the additional signal and odd numbered signal blocks being devoid of any portion of the additional signal.

18. The method as claimed in claim 14 further comprising the steps of:

finding the last frame of the first channel signal written in the at least one data track in an earlier recording step;

generating m frames of the first channel signal;

recording said m frames directly after the last frame earlier recorded, the said m frames being devoid of any portion of the data signal.

19. A record carrier comprising:

at least one data track;

at least one auxiliary track;

a first channel signal recorded on said at least one data track in the form of successive frames, some frames of said first channel signal having portions of a data signal, some frame of said first channel signal being devoid of any portion of said channel signal; and a second channel signal recorded in said auxiliary track in the form of successive frames, each frame of said second channel signal having p signal blocks, where p is an integer greater than 1;

said frames of said second channel signal being recorded so that based upon an absence or a presence of a portion of said additional signal in a frame of said second channel signal, a determination is made as to whether there is any portion of said data signal in a corresponding frame of said first channel signal.

20. The record carrier as claimed in claim 19 wherein p is an even integer number larger than 2 and that, if the frame of the first channel signal generated comprises a portion of the channel signal, the corresponding frame of the second channel signal has even numbered signal blocks comprising a portion of the additional signal and odd numbered signal blocks being devoid of any portion of the additional signal.

* * * * *